(12) United States Patent
Groenendaal

(10) Patent No.: US 6,975,625 B1
(45) Date of Patent: Dec. 13, 2005

(54) DISTRIBUTED CALL CONTROL PROCESSING

(75) Inventor: Edward John Groenendaal, New South Wales (AU)

(73) Assignee: Cisco Technology, Inc., San Jose, CA (US)

( * ) Notice: Subject to any disclaimer, the term of this patent is extended or adjusted under 35 U.S.C. 154(b) by 888 days.

(21) Appl. No.: 09/934,347

(22) Filed: Aug. 20, 2001

(51) Int. Cl.[7] .............................................. H04L 12/66
(52) U.S. Cl. ..................................................... 370/356
(58) Field of Search ............................... 370/352, 353, 370/354, 356

(56) References Cited

U.S. PATENT DOCUMENTS

| | | | |
|---|---|---|---|
| 6,353,847 B1 * | 3/2002 | Maruyama et al. | 718/105 |
| 6,826,272 B1 * | 11/2004 | Dalrymple et al. | 379/220.01 |
| 2002/0126676 A1 * | 9/2002 | Johnson et al. | 370/395.41 |
| 2004/0151166 A1 * | 8/2004 | Tsukagoshi et al. | 370/352 |

OTHER PUBLICATIONS

ITU-T (Telecommunication Standardization Sector of ITU) H.323 (Feb. 1998) *Series H: Audiovisual and Multimedia Systems, Infrastructure of audiovisual services—Systems and terminal equipment for audiovisual services*, "Packet-based multimedia communications systems" (124 pages).

* cited by examiner

*Primary Examiner*—Melvin Marcelo
(74) *Attorney, Agent, or Firm*—Marger Johnson & McCollom, P.C.

(57) ABSTRACT

A network device and a method of distributed call control processing. The network device includes at least one port, at least two call processors, a memory, and a central processing unit. The method receives a call setup message and determines if a call processor is assigned to that call. If no call processor is assigned, a central processing unit assigns a least-loaded call processor to the call and that call processor sets up the call.

18 Claims, 2 Drawing Sheets

DISTRIBUTED CALL CONTROL PROCESSING

BACKGROUND

1. Field

This disclosure relates to call control processing, more particularly to call control processing distributed across multiple network devices in multimedia communication system.

2. Background

Multimedia communications systems typically involve using a data network of a standardized format to provide audio communications, such as Voice over Internet Protocol (VoIP), and/or audiovisual communications such as video-conferences. In the example of VoIP, the standardized format is Internet Protocol. Other types of standardized data networks may exist, including Frame Relay (FR) or Asynchronous Transfer Mode (ATM) as well as hybrids of any of the above, as examples.

These data networks typically require some equipment that allows the data being carried in the standardized format to be converted into a data stream compatible with telephone networks. For example, a user may have a VoIP phone as the data network terminal within a corporation at campus A. The user may want to call a party at campus B. The party at campus B may have a VoIP phone as well, but the two corporate campuses are connected by the public switched telephone network (PSTN). Alternatively, the party at campus B may be using a PSTN phone. In either case, the VoIP call must be converted into a format that allows it to be carried across the PSTN. Note that as used here, PSTN will include Integrated Services Digital Networks (ISDN).

The converters are usually a particular type of network device referred to as a gateway. The gateway receives a call from the PSTN bound for a data network terminal or from the data network terminal bound for the PSTN. The gateway converts the incoming format into the outgoing format. The handling of each call, either inbound or outbound, is handled within the gateway. These architectures allow processing to be distributed across more than one processor, providing a high capability at the gateway.

The distribution of processing tasks generally does not include call control. Call control determines how each call is handled. Currently, most gateways have a single CPU that handles call control, meaning that as each call comes into the gateway a single CPU translates the call control data and determines which processor will handle that call. This is repeated for every packet or other set of data that enters the gateway for conversion. Having a single CPU for handling call control gives rise to the possibility of a single point of failure in a network device, as well as not capitalizing upon the presence of any other processors that may be in the system.

SUMMARY

An aspect of the disclosure is a method of controlling calls in a gateway. A network device receives a call setup message for a call for a sending device. The network device determines if a call processor is associated with the call. If not, the network device locates a call processor that has the least amount of processing load and assigns the call to the least-loaded call processor. A connection is established between the call processor and the sending device.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
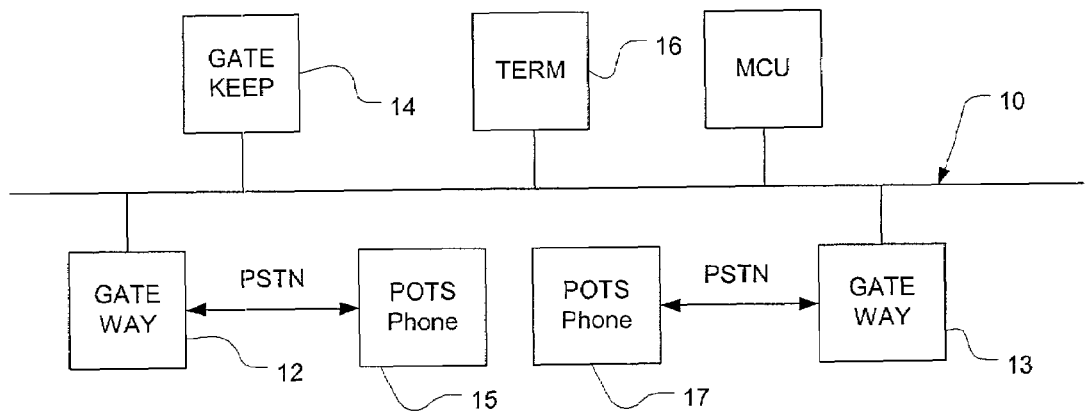
FIG. 1 shows one embodiment of a multimedia communications system hub, in accordance with the invention.

FIG. 1 shows an example of a portion of a multimedia communication system, which uses a data network to provide communications channels between various terminals on the system. For purposes of this discussion, this portion will be referred to as a hub 10 of the communication system, which may have several different hubs connected through both data networks and the Public Switched Telephone Network (PSTN).

When a call comes in from the PSTN from a standard phone 15 to the gateway 12, a gatekeeper 14 is notified. The standard phone 15 is sometimes referred to as a 'plain old telephone system' (POTS) phone. The gatekeeper handles most of the administrative tasks for the hub, including admissions control, address translation, bandwidth control and billing. The gatekeeper also sends the appropriate call initiation messages to the appropriate gateway 12 or 13, or terminal 16, as determined by the nature of the call. For example, if the call coming into the hub from the PSTN is for a PSTN number in the San Jose area, the gatekeeper sends the call initiation message to a gateway for the 408 area code. The gateway 13 will then handle the responsibilities for call setup and translation, as well as routing the translated call data via the PSTN to the destination standard phone 17. In this example, a caller with a standard phone calls a recipient with a standard phone, but the call is carried over a data network in the middle.

Another example is when one user has a standard phone and the other is on a terminal on the hub. In that case the call comes into the gateway from the PSTN, to the gatekeeper, then to the terminal 16. The gatekeeper essentially acts as a proxy for the call protocol between the gateway and the terminal. Session initiation protocol calls work in a similar fashion.

The gateway performs many functions; the one of interest here is translation of calls between the data network and the PSTN. It performs two tasks as part of that function. The first is call control, the act of negotiating parameters related to the call such as voice, data, bandwidth, coder/decoder to use, quality, admission control, accounting, authorization, and the co-ordination and sequencing of call setup between two or more parties. The second is data transmission, the act of translating data of one format into packet form and transmission of those packets, such as a pulse code modulated data stream from the PSTN into a data packet stream in over an IP network, establishing logical channels between the call processors performing the translation and the sending device on the other end of the PSTN, etc. The second task of interest here is the actual processing of the call. For purposes of this discussion, a gateway is a set of boards that include trunk line boards and processing boards, such as digital signal processing boards. The gateway may also include a central processing unit.

While this is a more common definition of gateway, an alternative configuration is possible with a gateway having multiple CPUs. The gateway could be a network device on a single transmission control protocol (TCP) connection. The gateway in this alternative has two or more processors and the application of the invention will distribute the call control processing between them for more efficient operation. This will be discussed further with regard to FIGS. 2 and 3.

The example discussed above with regard to FIG. 1 related to incoming calls. For purposes of this disclosure, an incoming call is a call that originates on the PSTN and is then routed through a gateway onto a data network. An outgoing call travels out through the gateway to the PSTN. The originator may be a data network terminal or another gateway. The process of outgoing calls from the hub 10 to the PSTN is very similar, but occurs in reverse order. The terminal calls into the gatekeeper with an outgoing call request. The gatekeeper assigns the gateway local to the PSTN destination of the call and routes the call control data to that gateway. The gateway then performs the call conversion/translation task, which is managed by the call control processing. The call is then routed out to the PSTN through the gateway.

Figure 2:
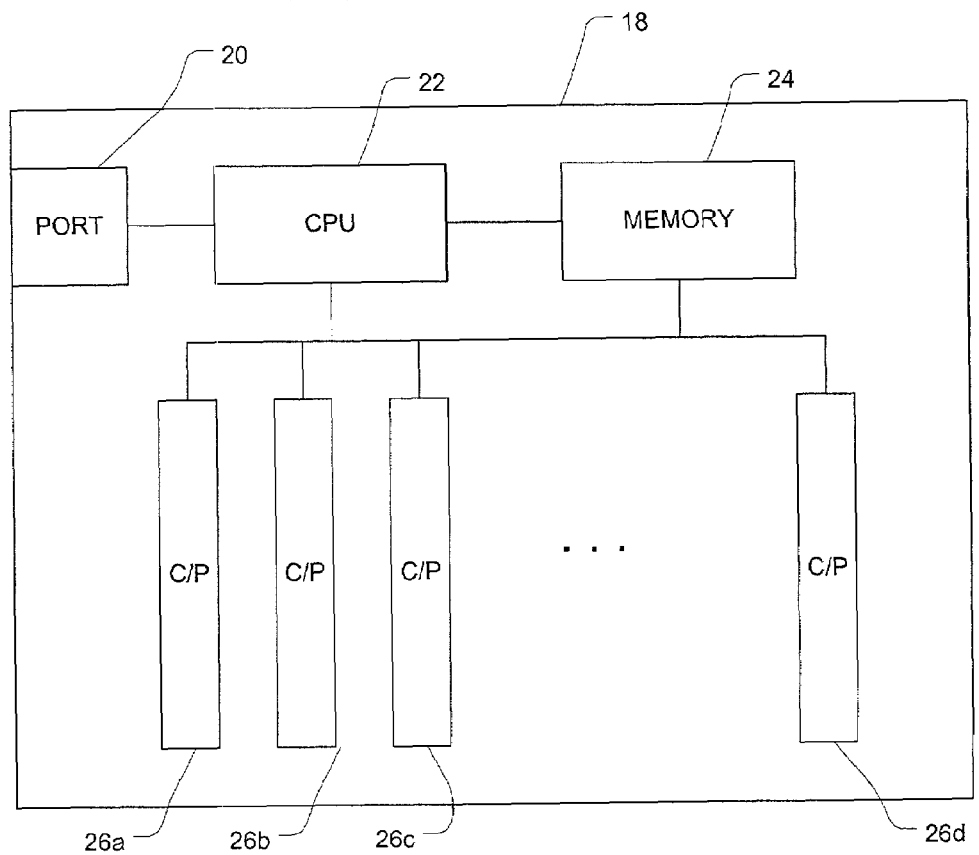
FIG. 2 shows one embodiment of a network device having distributed call control processing, in accordance with the invention.

A network device 18 that may perform as a gateway 12, in accordance with the invention, is shown in FIG. 2. The device has at least one port 20 that connects the network device to the gatekeeper and the communication system. A central processing unit (CPU) 22 handles the call control tasks, as mentioned above. The CPU 22 also accesses a memory 24, which stores data related to call control, such as which call processor (C/P) 26a–26n is handling which call. Note that the designation of 'n' as used here is not literal, in that there may be more than fourteen call processor boards 26, but in the mathematical sense that the variable 'n' is undetermined.

The call processors are assigned calls as the CPU 22 receives call setup messages. In the current art, the call control processing is not distributed, although the actual call processing is. Typically one CPU performs call control processing. That is, one CPU receives the PSTN protocol and translates it into whatever type of packet or data format used in the multimedia communication system hub. For ease of discussion these will be referred to as packets, even though they may be other 'slices' of data, such as frame relay frames. Once the CPU has translated the PSTN call control protocol into the appropriate format, it forwards it to the gatekeeper, which then manages the call control processing by one of various call processors, including CPUs.

In one embodiment of the invention, the network device 18 and the memory 24 are connected through an egress wide area network (WAN) interface and the memory is a Ternary Content Addressable Memory (TCAM). The call setup messages used by the data communication system comply with the International Telecommunications Union (ITU) standard H.225, "Call Signaling Protocols and Media Stream Packetization for Packet-based Multimedia Communication Systems." The CPU and TCAM can then peek inside the packets and redirect them as necessary, as is discussed with regard to FIG. 3. When a new call comes in, the H.225 packet is forwarded to the CPU, which then routes it to a least-loaded call processor, assigning that call processor to the call, and the TCAM is updated to direct any further packets with the same call identifier to the assigned call processor.

In the below example, assume the communication system complies with H.323 "Packet-based Multimedia Communication System." A specific example of how this particular example would apply the invention may aid in understanding of the invention.

The gatekeeper is notified of a call for 408-123-4567. If it is an incoming call, the call will be from the PSTN. For an outgoing call it will originate from a terminal or gateway. The gatekeeper then locates a gateway connected to the 408 area code. The gatekeeper sends a setup message that complies with H.225, referenced above, possibly using Fast Start Open Logical Channel, to the Internet Protocol (IP) address for that gateway. The gateway, or network device, receives the H.225 setup message, possible encapsulated within a (User Datagram Protocol) UDP transport packet. UDP allows more direct sending of data across an IP network.

However, as mentioned above, similar techniques could be applied to a multiple CPU system to balance the load between the CPUs. For example, the H.225 message, for this example, may alternatively travel in a multiplexed fashion over a single TCP connection between a gateway and a gatekeeper. This allows the system to distribute call control processing across multiple processors. The core CPU acts as a proxy for the distributed CPUs. All messages to and from the outside world terminate on the core CPU. The core CPU then forwards the received packets to the designated party to the distributed CPU assigned that call for incoming calls, and to the gatekeeper or remote gateway for outgoing calls.

Returning to the example, upon reception of the H.225 message, the network device uses TCAM to look up the gatekeeper address and the H.225 call identifier. If no match is found, it is forwarded to the CPU. The CPU receives the packet and locates the least loaded call control processor. The CPU then forwards the packet to that call control processor. Meanwhile, the TCAM is reprogrammed to reflect the new assignment of the call control processor. The call control processor receives the packet and processes the setup message. In the case of an incoming call from the PSTN, the call control processor creates an H.225 admission request to send back to the gatekeeper, which handles admission control.

For the incoming call, the call control processor sends the admission request to the gatekeeper identified by the IP address and call identifier in the setup message. The gatekeeper receives the admission request and grants the request, typically with an admission confirmed packet to the gateway. The call control processor on the gateway receives the admission confirmed packet and replies with a connect message. If Fast Start Open Logical Channel is used, an acknowledgement complying with this channel is used. For an outgoing call, the call control processor communicates with the gatekeeper as the call is processed. For an incoming call, the call processor then programs the TCAM with the information needed to establish a logical channel. For the above example, the logical channel is established in accordance with H.245 "Control Protocol for Multimedia Communications." This then allows a logical channel to be established between the sending device and the call processor. Packets related to this call are automatically forwarded directly to the call processor for call control. With application of the invention, the CPU no longer has the responsibility of processing the PSTN protocol and translating it to H.225 and forwarding it to the gatekeeper for processing. Once the H.225 packet is formed, it is routed directly to the assigned call processor. For outgoing call, the CPU hands the translation task off to the distributed call control processor that communicates through the PSTN with the receiving device.

Figure 3:
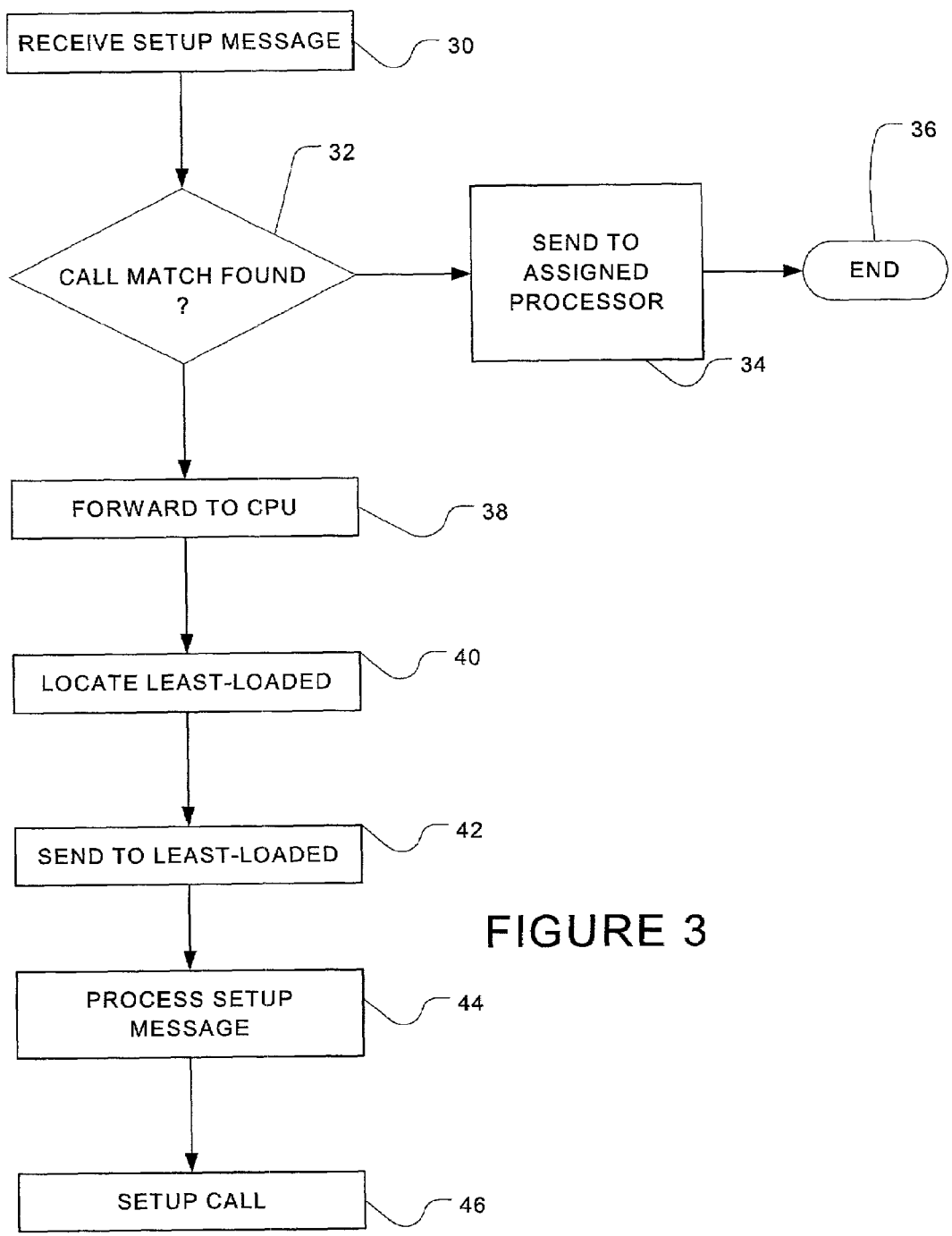
FIG. 3 shows a flowchart of one embodiment of a method for distributed call control processing, in accordance with the invention.

Having seen a specific example, it is now possible to understand the more general application of the methods of the invention. FIG. 3 shows a flowchart of one embodiment of a method of distributing call control processing in a multimedia communications system. The gateway receives the call setup message, either from the gatekeeper for outgoing calls or PSTN for incoming calls, at 30. It then accesses TCAM or other call assignment tracking mechanism to determine if the call identified by in the message has been assigned at 32. If a match for that call is found, the call is routed to the assigned call processor at 34 and the processes ends at 36 until the next setup message is received.

If no match for the call is found at 32, the setup message is sent to the CPU at 38. The CPU then locates the least-loaded call processor at 40 and routes the setup message to that call processor at 42. The call processor processes the call setup message at 44 and the call is setup directly between the call processor and the sending device at 46. Again, the sending device may be a terminal or a gateway on the local hub of the data network for outgoing calls, or on the PSTN for incoming calls.

In this manner, the processing of call control data and performance of those tasks is distributed to other processors in the network device. The other processors in the system may be call processors or one of a multiple CPU system acting as a call processor. This increases the processing efficiency of the network device.

Typically, the methods of the invention will be implemented in a network device as software. The network device accesses an article containing machine-readable code. When the network device executes the code it causes the machine to perform the methods of the invention. The network device may be a router or other machine having the capability of executing machine-readable code.

Thus, although there has been described to this point a particular embodiment for a method and apparatus for distributed call control processing, it is not intended that such specific references be considered as limitations upon the scope of this invention except in-so-far as set forth in the following claims.

What is claimed is:

1. A network device, comprising:
   at least one port to receive multiple calls and to allow the network device to communicate directly with a gatekeeper;
   at least two call processors, operable to convert incoming call data associated with the multiple calls into outgoing call data;
   a memory operable to store call identifications and any call processor identification associated with those call identifications;
   a central processing unit, operable to:
   access the memory to determine if a call is already associated with a call processor;
   assign a call processor if none is assigned; and
   update the memory to reflect new assignments.

2. The network device of claim 1, wherein the network device is a gateway.

3. The network device of claim 1, wherein the network device is a router.

4. The network device of claim 1, wherein the central processing unit is one of the call processors.

5. The network device of claim 1, wherein the memory further comprises ternary content addressable memory.

6. A method of controlling outgoing calls in a gateway, the method comprising:
   receiving a call setup message directly from a gatekeeper for a call from a sending device;
   determining if a call processor is associated with the call;
   locating a call processor that has the least amount of processing load, if no call processor is associated with the call;
   routing the setup message to the call processor with the least amount of load; and
   establishing a connection between the call processor and the sending device.

7. The method of claim 6, wherein the call setup message is sent with fast start open logical channel.

8. The method of claim 6, wherein the call setup message is in accordance with H.225.

9. The method of claim 6, wherein the call setup message is encapsulated in a UDP packet.

10. The method of claim 6 wherein establishing a connection between the call setup message and the sending device further comprises establishing a logical channel in accordance with H.245.

11. A network device, comprising:
    a connection means, including directly between a gateway and a gatekeeper;
    at least two processing means for converting incoming call data into outgoing call data;
    a means for storing call identifications and any call processor associated with those call identifications;
    means for:
    accessing the memory to determine if a call is already associated with a call processor;
    assigning a call processor if none is assigned; and
    updating the memory to reflect new assignments.

12. The network device of claim 11, wherein the means for accessing the memory is one of the at least two processing means.

13. The network device of claim 11, wherein the means for storing call identifications further comprises a ternary content addressable memory.

14. An article containing code on a machine-readable medium that, when executed, causes the machine to:
    receive a call setup message directly from a gatekeeper for a call from a sending device;
    determine if a call processor is associated with the call;
    locate a call processor that has the least amount of processing load, if no call processor is associated with the call;
    route the setup message to the call processor with the least amount of load; and
    establish a connection between the call processor and the sending device.

15. The article of claim 14, wherein the machine is a network device.

16. The article of claim 14, wherein the machine is a gateway.

17. The article of claim 14, wherein the code causing the machine to establish a connection between the call processor and the sending device is in compliance with H.245.

18. The article of claim 14, wherein the setup message complies with H.225.

* * * * *